United States Patent [19]
Nanda et al.

[11] Patent Number: 5,842,113
[45] Date of Patent: Nov. 24, 1998

[54] METHOD AND APPARATUS FOR CONTROLLING POWER IN A FORWARD LINK OF A CDMA TELECOMMUNICATIONS SYSTEM

[75] Inventors: Sanjiv Nanda, Plainsboro; Kiran M. Rege, Marlboro, both of N.J.

[73] Assignee: Lucent Technologies Inc., Murray Hill, Del.

[21] Appl. No.: 631,721

[22] Filed: Apr. 10, 1996

[51] Int. Cl.[6] ....................................................... H04B 1/00
[52] U.S. Cl. ................... 455/69; 455/88; 375/200
[58] Field of Search .......................... 455/69, 54.1, 33.1, 455/88, 561, 522, 422, 127; 375/200, 333, 252

[56] References Cited

U.S. PATENT DOCUMENTS

| | | | |
|---|---|---|---|
| 4,972,439 | 11/1990 | Kuznicki et al. | 375/60 |
| 5,278,992 | 1/1994 | Su et al. | 455/69 |
| 5,383,219 | 1/1995 | Wheatley et al. | 375/1 |
| 5,461,639 | 10/1995 | Wheatley, III et al. | 375/205 |
| 5,564,075 | 10/1996 | Gourgue | 455/69 |

*Primary Examiner*—Reinhard J. Eisenzopf
*Assistant Examiner*—Darnell R. Armstrong
*Attorney, Agent, or Firm*—Frederick B. Luludis

[57] ABSTRACT

A facility is provided for more efficiently controlling transmitted power in a forward link of CDMA telecommunications system. This is done by offsetting a power reference level that adjusts the level of the transmitted power using an power offset selected as a function of a transmission rate specified for the transmission of a coded frame. The coded frame is then transmitted at a power level selected as function of the adjusted power reference level, rather than the unadjusted level. Such efficiently is particularly noticeable when there is transition from one frame transmission rate to another such rate and vice-versa.

13 Claims, 6 Drawing Sheets

METHOD AND APPARATUS FOR CONTROLLING POWER IN A FORWARD LINK OF A CDMA TELECOMMUNICATIONS SYSTEM

FIELD OF THE INVENTION

The invention relates to wireless telecommunications, and more particularly relates to controlling transmitted power in a code-division multiple access (CDMA) system.

BACKGROUND OF THE INVENTION

In wireless, cellular, telecommunications systems, a base station transmits information bits grouped into frames at a power level that is intended to be sufficient to permit a receiver to receive the frames at a desired frame error rate, e.g., a frame error rate of about 1%. The receiver continually returns (feedback) information indicative of the Frame Error Rate (FER) to the base station. If the feedback indicates that the FER occurring at the receiver is greater than the desired FER, then the base station (transmitter) increases the transmit power level. Conversely, if such feedback indicates otherwise, then the base station lowers the transmit power level.

In voice communications systems, a variable rate vocoder processes speech and periodically produces a frame containing a variable number of bits, for example, a full-, half-, quarter-, or eighth-rate frame, as disclosed in the Telecommunications Industries Associations (TIA) Interim Standard IS 95, available from TIA located in Washington, D.C., which is hereby incorporated by reference. Moreover, in wireless systems adhering to the IS 95 standard, it is common practice to keep the total transmitted energy per bit (Eb) substantially the same for any of the aforementioned frame rates. A wireless system may achieve this for a half-, quarter-, or eighth-rate frame, by transmitting a symbol repeatedly for two, four or eight times, respectively, with the transmitted power reduced correspondingly, as specified in the IS 95 standard.

We have observed that maintaining substantially the same transmit energy per bit for all of the aforementioned frame rates results in (a) inefficient use of transmitted power, (b) high frame error rates during transitions between frame rates and (c) an increase in interference experienced by receivers other than the targeted receiver.

SUMMARY OF THE INVENTION

We deal with the foregoing problems and advance the relevant art of controlling the transmitted power in a forward link of a CDMA telecommunications system by adjusting the power reference value as a function of a power offset value selected as a function of the transmission rate at which a coded frame is to be transmitted The coded frame is then transmitted at a power level selected as a function of the adjusted power reference value.

In accord with one illustrative embodiment of the invention, we generate a plurality of power offset values associated with respective frame transmission rates, and, responsive to receipt of an indication identifying the transmission frame rate for the coded frame the appropriate power offset value is selected as a function of the identified transmission frame rate. The value of the reference power level is then adjusted as a function of the selected offset value and the coded frame is then transmitted at a power level derived as a function of the adjusted reference power level.

These and other aspects of the invention are disclosed in the following detailed description and accompanying drawings.

BRIEF DESCRIPTION OF THE INVENTION

Figure 1:
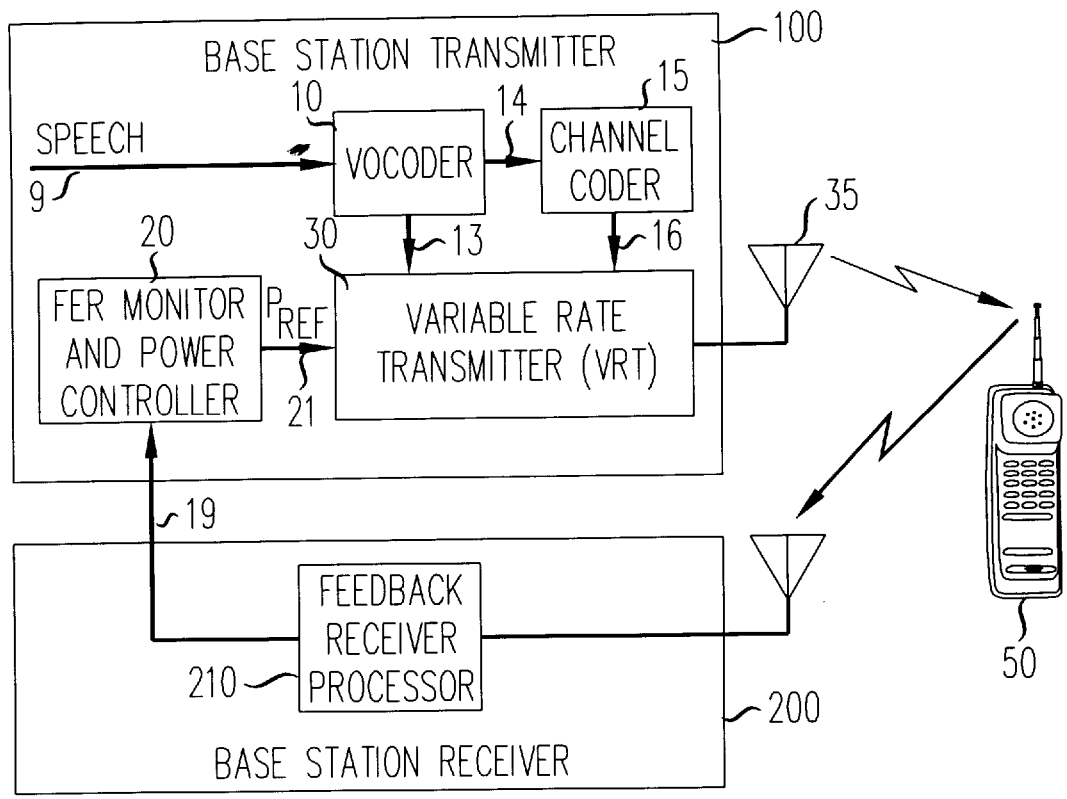
FIG. 1 illustrates a prior art transmitter arranged to control the level of forward link transmitted power as a function of a power reference level in a CDMA telecommunication system.

The transmitter section of a conventional base station transmitter 100, FIG. 1, for wireless telecommunications system includes, inter alia, vocoder 10, channel coder 15, Frame Error Rate (FER) monitor and power controller 20 and Variable Rate Transmitter (VRT) 30. Vocoder 10, more particularly, receives speech signals via path 9 that are to be transmitted to mobile station 50 via antenna 35 and encodes the speech signals in accord with a predetermined encoding scheme, e.g., linear predictive coding, to produce a coded speech frame. Such a frame is generated periodically, e.g., once every twenty milliseconds. Vocoder 10, based on the speech activity that occurs at its input in a twenty millisecond period, determines the frame rate that should be used in the encoding of the speech signals. For example, in the above-mentioned IS 95 standard, the number of bits forming a frame may vary and take one of four different values respectively corresponding to a full-, half-, quarter- or eighth-rate frame Vocoder 10 then outputs the coded frame to channel coder 15 via path 14. In addition, vocoder 10 presents to VRT 30 via path 13 the frame rate that was used in the encoding of the frame outputted to path 14.

Channel coder 15 further processes the encoded frame to add so-called forward error correction capability, using, for example, the convolutional coding scheme specified in the IS 95 standard. Channel coder 15 then outputs the resulting encoded frame (also referred to hereinafter as the channel coded frame) to VRT 30 via path 16.

VRT 30 uses the frame rate received via path 13 to select one of a number of different transmission schemes that it will use to transmit the channel coded frame received via path 16. VRT 30 also uses a reference power level that it receives via path 21 to determine the power level that will be used in the transmission of the channel coded frame. VRT 30 transmits the channel coded frame via antenna 35 in accord with the selected transmission scheme and at a power level corresponding to the reference power level such that the energy per transmitted bit is substantially the same for all frame rates.

Such transmitting may be achieved, for example, in accord with the rate based transmission scheme specified in the IS 95 standard, in which, for a partial rate (e.g., half-, quarter- or eighth-rate) channel-coded frame, an encoded bit is repeatedly transmitted in inverse proportion to its frame rate (i.e., two, four or eight times, respectively). To maintain the same transmission energy per bit for all frame rates, the transmit power level is reduced as a function of the frame rate. For example, in a quarter-rate frame, an encoded bit is transmitted four times at a power level that is one-fourth of the power level corresponding to the value of the reference power level received via path 21. Whereas, for a full-rate frame, an encoded bit is transmitted once at the power level corresponding to the value of the reference power level.

Figure 2:
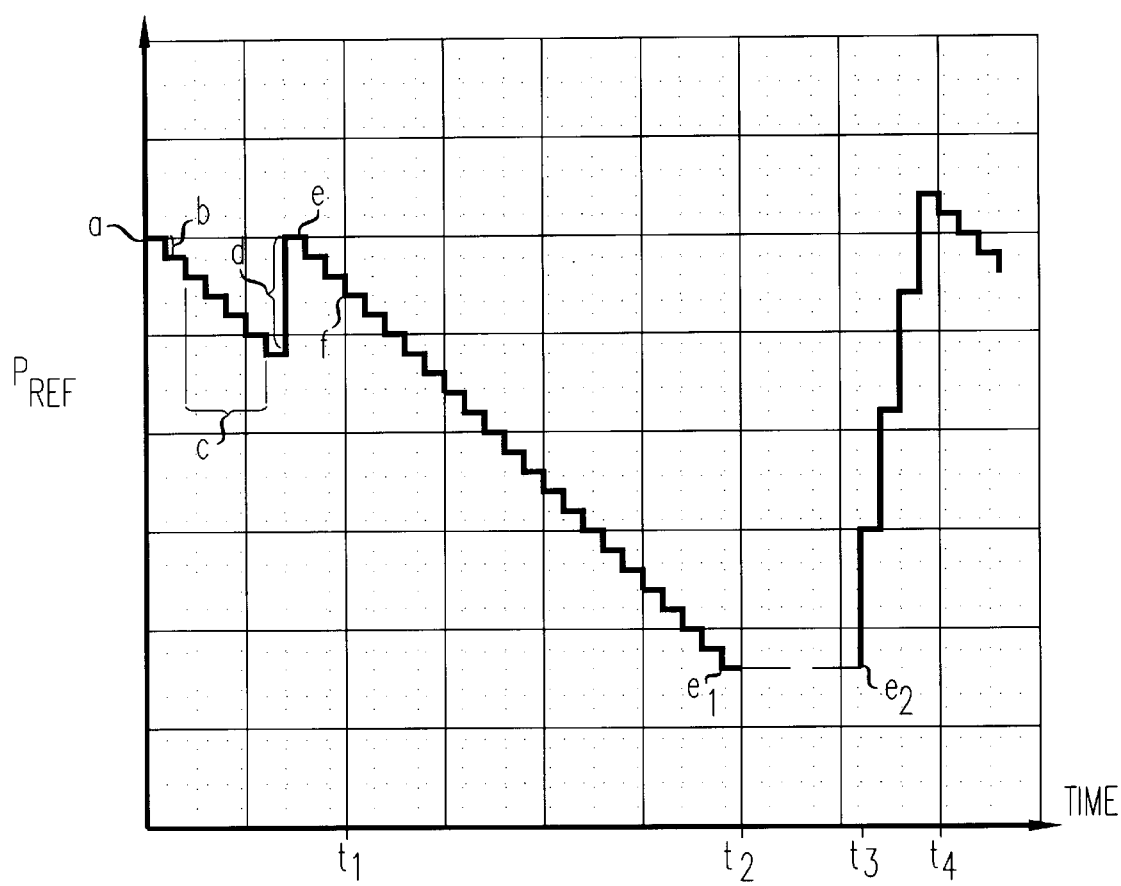
FIG. 2 illustrates graphically the way in which the power reference level adapts to a change in the transmission rate applied to coded frames.

Information that VTR 30 transmits via antenna 35 is received by a target mobile station, e.g., station 50, as well as other mobile stations (not shown) that are within the coverage area (cell) of base station transmitter 100. Mobile station 50 receives the transmitted channel coded frame and processes it in accord with a predetermined decoding scheme to recover the original information. In doing so, mobile station 50 determines if the frame was received correctly or contains errors and transmits the result of the determination to base station receiver 200 via a reverse "feedback" channel. That is, mobile station 50 transmits an indication of the error rate that it is experiencing with respect to the channel coded frame that it received from the base station. This error indication may be transmitted "raw" identifying the error status of each received frame on a frame by frame basis. Such an error indication may be sent, on the other hand, less frequently in an aggregate form where the mobile station informs the base station of the average received FER that occurred over a certain "observation" interval. Feedback processor 210 of receiver section 200 receives the content of the feedback channel and supplies such content to FER monitor and power controller 20 via path 19. Controller 20 processes the feedback information to generate an estimate of the error rate that is occurring at station 50 and adjusts the reference power level, Pref, as a function of the estimate and supplies the adjusted value to path 21, as mentioned above. That is, if the estimated FER is lower (higher) than the desired FER, then the reference power level is increased (decreased), for example, as shown in FIG. 2.

For example, assume a system in which mobile 50 provides on a frame by frame basis an indication of whether the received frame was error free or contained errors. Also assume that transmitter 100 is transmitting a series of frames at a full frame rate, and that at a particular instant in time, transmitter 100 is transmitting a frame at a reference power level "a", as shown in FIG. 2. If the above-mentioned feedback indicates that the transmitted frame was received free of errors, then FER monitor and power controller 20 reduces the reference power level by a value equal to a down-step size "b". If such error-free transmission continues, as verified by the feedback provided by receiver 50, then FER monitor and power controller 20 further reduces Pref for the frames transmitted during time period "c". Assume now that the next frame that station 50 receives contains errors and that station 50 advises base station transmitter 100 of that fact via the reverse "feedback" channel. In that case then, FER monitor and power control-ler 20 raises the value of Pref by a value equal to an up-step size "d". (Note that it is common practice to choose the ratio of the down-step size to the up-step equal to the desired FER.)

Assume now that at time $t_1$ transmitter 100 begins to transmit a series of frames at an eighth rate. Recall that for the same frame error rate, the transmit energy per bit needed for an eighth-rate frame is lower than that for a full rate frame. The reasons for this include (a) since symbols in a channel coded eighth rate frame are repeated eight times with the same energy per bit, the so-called diversity gain results in a much lower symbol error rate, leading to an even lower frame error probability; and (b) since the total number of information bits transmitted in eighth-rate frame is smaller by a factor of eight, the frame error probability for the same the symbol error rate is smaller. It can be appreciated that when an eighth-rate frame is transmitted at a power level corresponding to Pref at "e", the FER at the receiver will be well below the desired FER. Thus, FER monitor and power controller 20 continues to decrease Pref as long as the feedback from receiver 50 indicates error free transmission. This continuous decrease in Pref extends from time $t_1$ to time $t_2$. The duration of time represented by $t_2$ minus $t_1$ may be, for example, several hundred milliseconds to one or more seconds—which means that the transmit power level during that time is too high and, therefore, inefficient in the use of power and generates excessive interference to other connections.

Assume now that the at time $t_3$ transmitter 100 begins to transmit a series of full rate frames, and transmits the first of the frames at a power level corresponding to a particular value of Pref, e.g., the value represented at "$e_2$", which is likely to be close to the reference power level at "$e_1$". It may be appreciated that when a full-rate frame is transmitted at a power level corresponding to Pref at "$e_1$", the FER at the receiver will be well above the desired error rate. For this case, then, FER monitor and power controller 20 increases Pref as long as the feedback from receiver 50 indicates that the FER at receiver 50 is higher than the desired FER. This continuous increase in Pref may extend from time $t_3$ to time $t_4$. The duration of time extending from $t_3$ to $t_4$ represents a period of time during which the FER at the receiver is much larger than the desired error rate.

Figure 3:
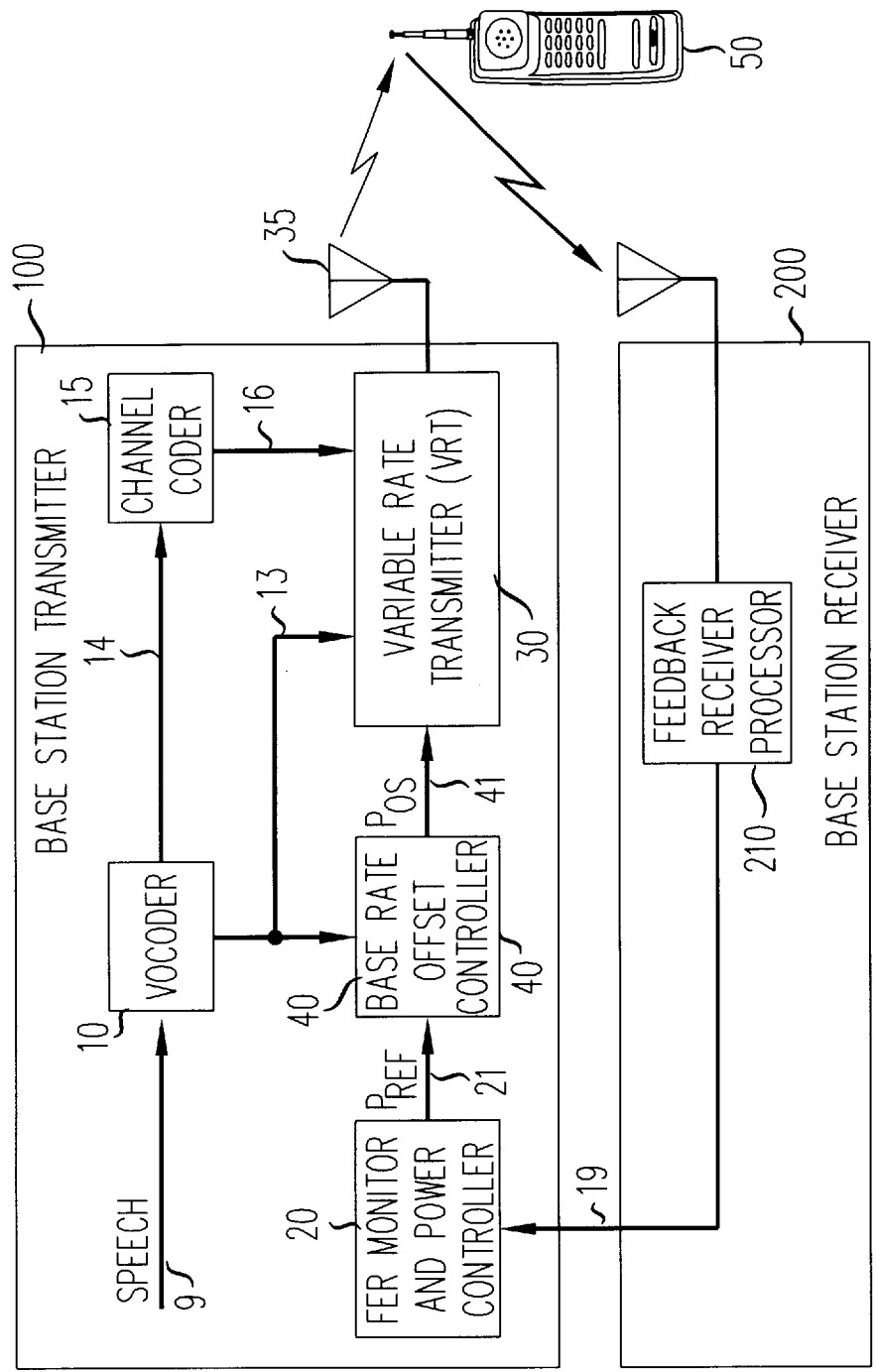
FIG. 3 illustrates one way in which the transmitter of FIG. 1 may be arranged to implement the principles of the invention.

We deal with the inefficient use of power problem and the latter error rate problem by responding to changes in the frame rate more quickly than prior base station transmitters. Specifically, when the frame rate changes, we quickly adapt the value of Pref so that it is substantially close to the value that is appropriate for the new frame rate. This is achieved, in accord with an aspect of the invention, by using an off-set controller in the prior art circuit of FIG. 1, as shown in FIG. 3.

In particular, rate-based offset controller 40 is disposed between FER monitor and power controller 20 and VRT 30 for the purpose of off-setting Pref to a level suited for the current frame rate. That is, rate-based offset controller 40 receives the value of Pref via path 21 and adjusts that value as a function of the frame rate that it receives from vocoder 10 via path 13. If the frame rate changes, then controller 40 adjusts the value of Pref as a function of an offset value that is selected (generated) for the new frame rate, as will be explained below. Controller 40 then supplies the adjusted value of Pref as an offset power level Pos to VRT 30 via path 41. Similarly, VRT 30 transmits the channel coded frame at a power level corresponding to the value of a offset power level that it receives via path 41, namely the value of Pos.

Figure 4:
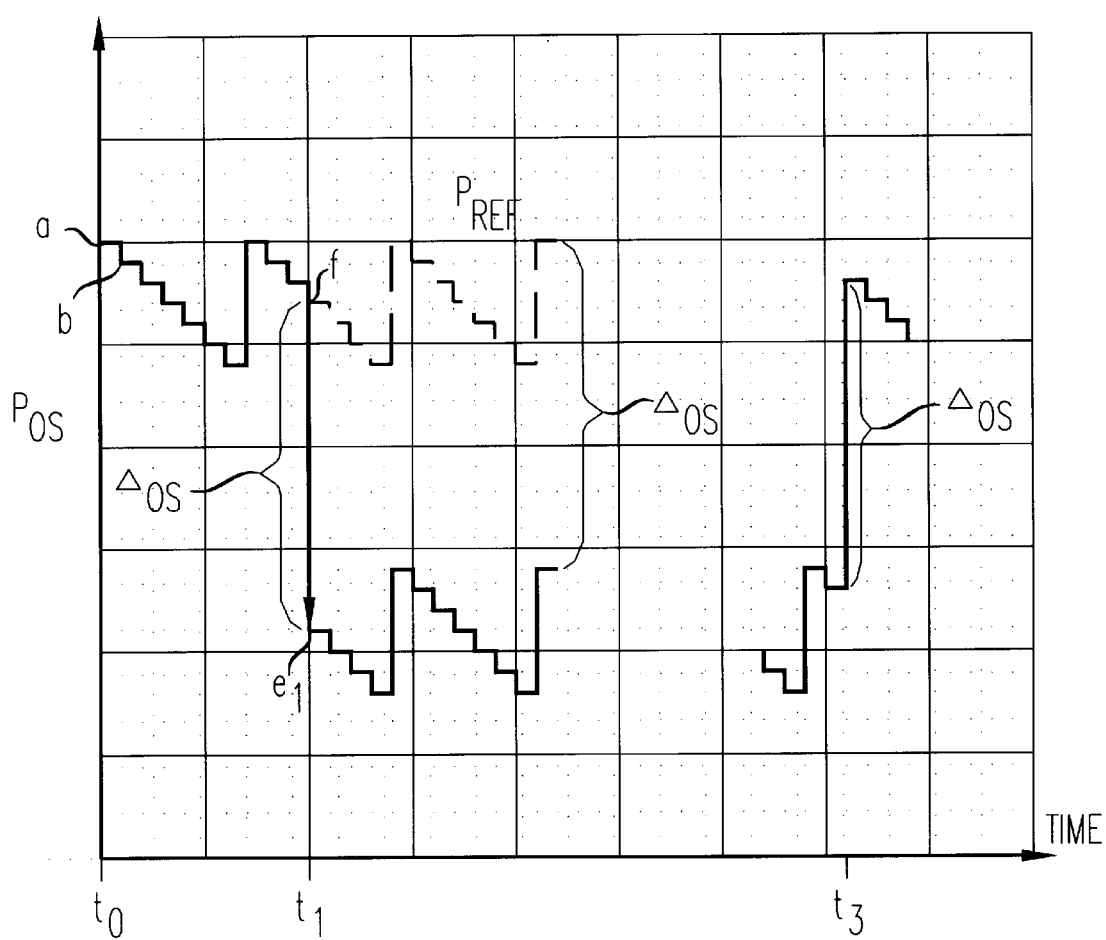
FIG. 4 illustrates graphically the way in which the power reference level adapts in accord with an aspect of invention to a change in the transmission rate applied to coded frames.

FIG. 4 illustrates the way in which an offset quickly adjusts Pref so that it is substantially close to the value appropriate for a new frame rate. FIG. 4 assumes the same conditions assumed for FIG. 2. It is also assumed that $\Delta_{OS}$ (1), the off-set value for a full-rate frame, is chosen to be zero (0) dB. Thus, it is seen that from $t_0$ to $t_1$ when VRT 30 is transmitting the series of full rate frames, Pos substantially follows the values shown for Pref in FIG. 2 (and as also shown in FIG. 4). At time $t_1$, when the transmitter begins to transmit the series of frames at the eighth-rate, rate-based offset controller 40 applies an offset of size $\Delta_{OS}$ (⅛) to Pref, which causes the resulting Pos value to quickly adapt to the desired level for the eighth frame rate. It is thus seen from FIG. 4 that as a result of applying the offset to Pref, the offset power level, Pos, that is supplied to VRT 30 is changed quickly and coincidentally with the change in the frame rate, which is unlike the slow response that is obtained by the prior art as is illustrated in FIG. 2 between times $t_1$ and $t_2$. A similar offset, $\Delta_{OS}$ (1), is applied at $t_3$ when the full rate frame transmission is resumed, which eliminates the response time $t_3$ to $t_4$ (FIG. 2) that is consumed in prior art arrangements to change Pref to the desired level.

It is also seen from FIG. 4 that the values that Pref assumes (as shown by the dashed line) do not track the values shown for Pref in FIG. 2 for the period from $t_1$ to $t_2$. The reason for this is that the offset power level, Pos, provides the appropriate power level indicator to VRT 30. Accordingly, Pref does not have to change substantially whenever the frame rate changes, since that function is now largely assumed by the value of the offset.

Figures 5, 6:
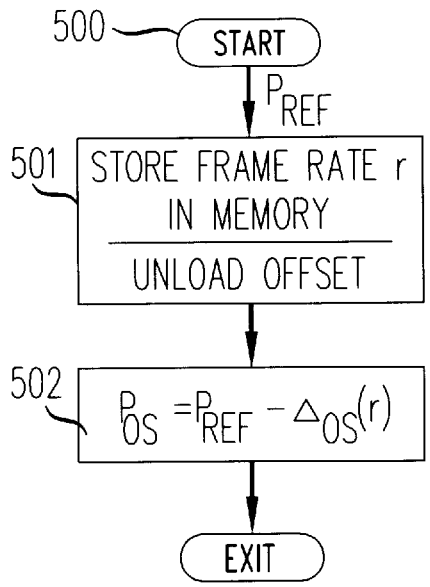
FIG. 5 shows in flow chart form an illustrative program which implements the principles of the invention in the rate-based controller of FIG. 3.
FIG. 6 shows a table of offset values associated with respective frame rates that is used by the program of FIG. 5.

FIG. 5 illustrates in flow chart form the program which implements the invention in rate-based offset controller 40. Specifically, the program (500) is entered upon receipt of a current value of Pref from circuit 20 and a current frame rate from vocoder 10 and proceeds to block 501. At block 501, the program stores the current frame rate in associated memory (not shown), and then uses the current frame rate as an index to access a table of offset values that correspond to respective frame rates. An example of such a table is shown in FIG. 6 and includes a plurality of entries, e.g., four entries 601 through 604, respectively, corresponding to full rate-, half rate-, quarter rate- and eighth rate frames and specifying an offset for the corresponding frame rate. For example, for a half-rate frame, the offset $\Delta_{OS}$ (½) is 1.0 dB. Table 600 also specifies an offset for each of the other frame rates, namely, offsets of 0 dB, 2.5 dB and 4.0 dB, respectively. It is noted that such offsets were determined experimentally by determining the difference in the energy per bit required to achieve the desired frame error rate at each of the aforementioned frame rates.

Thus, at block 501 of FIG. 5, if the current frame is an eighth-rate frame, then the program unloads the contents of entry 604 of table 600. The program (block 502) then applies the offset to the current value of Pref. That is, the program subtracts the value of the offset, e.g., 4.0 dB, from Pref and supplies the result to VRT 30 as Pos. The program then exits to await receipt of the next value of Pref and frame rate.

It is noted that an adaptation process may be used in place of the entries recorded in table 600 to account for changes in the transmission link between the base station and target mobile station, e.g., station 50, as the mobile station changes its position and/or velocity, as well as changes in the surrounding environment and topography. It is likely that such changes would require corresponding changes in the energy per bit for each frame rate. Moreover, the difference in energy per bit required for different frame rates is not a constant, but is itself dependent upon the environment. Accordingly, there may be a need to adapt the offset to meet the current environment of the target mobile station.

Figure 7:
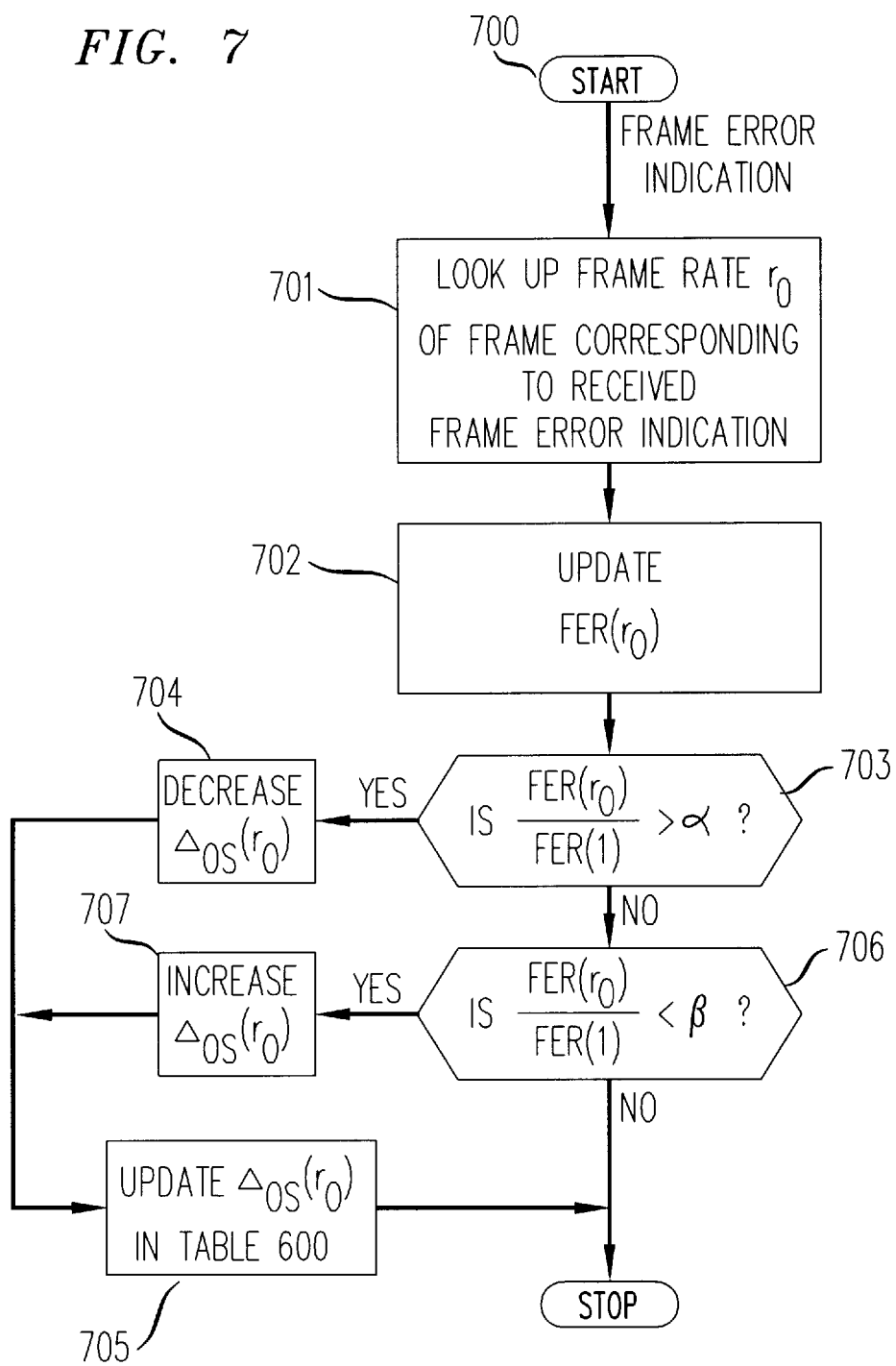
FIG. 7 shows in flow chart form another illustrative program which may be used to implement the principles of the invention in the rate-based controller of FIG. 3 and which adapts such offset values to the environmental conditions of a locality in which a target receiver is present.

An illustrative example of such an adaptation process is shown in FIG. 7. Again, the conditions for FIG. 7 assume frame by frame feedback. Specifically, the program is entered at block 700 responsive to receipt of a frame error indication via the reverse feedback channel. When so entered, the program proceeds to block 701 where it gets the frame rate ($r_0$) for the corresponding transmitted frame associated with the received frame error indication. The frame rate ($r_0$) is assumed to have been stored by rate based offset controller 40 as described at block 501, FIG. 5. When the frame error indication is received, the program (block 701) correlates that indication with the appropriate frame that was previously transmitted, thereby associating the error indication with the appropriate frame rate. The program (block 702) then updates the corresponding frame error rate FER($r_0$) using the received frame error indication. One such method that may be used to achieve such updating is disclosed in U.S. Pat. No. 5,383,219 issued Jan. 17, 1995 to C. E. Wheatley III et al, at column 7, line 45 et seq., which is hereby incorporated by reference.

Following such updating the program (block 703) compares the ratio of FER($r_0$) with the FER for a full rate frame, i.e., FER(1). If the value of the ratio exceeds the value of variable a (e.g., a value greater than one, such as 2), then the program (block 704) decreases the value of the offset corresponding to the rate $r_0$. The program (block 705) then updates the latter value, $\Delta_{OS}$ ($r_0$), in table 600 for the corresponding frame rate and then exits.

Otherwise, the program (block 706) checks to see if the value of the aforementioned ratio is less than the value of a variable β (e.g., a value less than one, such as ½). If that is the case, then the program (block 707) increases the value of the offset corresponding to the rate $r_0$. Similarly, the program (block 705) updates the value of $\Delta_{OS}$ ($r_0$) in table 600 for the corresponding frame rate and then exits. Otherwise, the program exits without updating the corresponding offset in table 600. (It is noted that, in practice, upper and lower limits are typically placed on the values that these offsets may take.)

The foregoing is merely illustrative of the principles of the invention. Those skilled in the art will be able to devise numerous arrangements, which, although not explicitly shown or described herein, nevertheless embody those principles that are within the spirit and scope of the invention. For example, although the claimed invention has been discussed in the context of a particular receiver feedback arrangement, it is clear that the invention may be used in conjunction with other forms of receiver feedback. As another example, it also clear that the claimed system may be used in other than a wireless system, e.g., a wired system. As a further example, a separate reference power level is maintained for each respective frame rate and then adapted to achieve a desired error rate for that frame rate at the remote receiver. Accordingly, a coded frame is transmitted at a reference transmit power level corresponding to the frame rate for the coded frame.

We claim:

1. A method of operating a transmitter in a cellular communications system, said method comprising the steps of generating a coded frame of signals, generating a plurality of power offset values associated with respective frame transmission rates, generating an indication identifying the frame transmission rate for the coded frame and selecting one of the power offset values as a function of the identified frame transmission rate, responsive to the selection, applying the selected offset value to a reference power level to obtain an offset power level value, and transmitting the coded frame at a power level derived as a function of at least the offset power level.

2. The method of claim 1 further comprising the step of transmitting each bit forming the coded frame repeatedly a number of times in which said number is inversely proportional to said indication.

3. The method of claim 1 further comprising the steps of receiving the coded frame at a target receiver, at said target receiver, generating an error rate from which the transmitter may determine an error rate at the receiver, and transmitting the error rate indicator via a reverse feedback channel.

4. The method of claim 3 further comprising the steps of at said transmitter, receiving said error rate indicator via said reverse feedback channel and adjusting said power reference level as a function of the received error rate.

5. The method of claim 3 wherein each of said power offset values are initially set to predetermined values and each is thereafter adaptively changed to adjust to a transmission environment associated with a location in which the target receiver situated.

6. A method of operating a transmitter for a cellular communications system, said method comprising the steps of generating an encoded frame of speech signals, generating a reference power level which is thereafter adjusted as a function of an estimated error rate occurring at a remote receiver and a predetermined error rate, generating a plurality of power offset values associated with respective frame transmission rates, receiving an indication identifying the transmission frame rate for the encoded frame and selecting a previously stored power offset value associated with the identified transmission rate, responsive to the selection, generating a offset power level, Pos, as a function of the reference power level, Pref, and the selected power offset value, $\Delta_{OS}$, transmitting the encoded frame at a power level derived as a function of the offset power level, Pos, changing the power offset value, $\Delta_{OS}$, such that an error rate at the remote receiver substantially meets a predetermined error rate and storing the current power offset value, $\Delta_{OS}$, in the memory in place of the previously stored power offset value for the identified frame rate.

7. A cellular communications system having a transmitter, said transmitter comprising, means for generating a coded frame of speech signals, means for generating a plurality of power offset values associated with respective frame transmission rates, means for receiving an indication identifying the transmission frame rate for the coded frame and for selecting one of the power offset values as a function of the identified transmission frame rate, means, responsive to the selection, for adjusting a reference power level by the selected power offset value, and means for transmitting the coded frame at a power level derived as a function of the adjusted reference power level.

8. The transmitter of claim 1 further comprising means for transmitting each bit forming the coded frame repeatedly for a number of times that is inversely proportional to said indication.

9. The cellular communications system of claim 7 including at one target receiver, said one target receiver comprising means for receiving the coded frame, means for generating an error rate indicator indicative of whether said code frame was received in error and extent of such error, and means for transmitting the error rate indicator via a reverse feedback channel to said transmitter.

10. The transmitter of claim 9 further comprising means for receiving said error rate indicator via said reverse feedback channel and for adjusting said power reference level as a function of the received error rate.

11. The transmitter of claim 9 wherein said power offset values are initially set to respective predetermined values and each is thereafter adaptively changed to adjust to an environment associated with a location in which the target receiver situated.

12. A method of operating a transmitter for a cellular communications system, said method comprising the steps of generating an encoded frame of speech signals, generating a reference power level such that when the coded frame is received at a remote receiver a frame error rate at the receiver meets a predetermined frame error rate, generating a plurality of power offset values associated with respective frame transmission rates, receiving an indication identifying the transmission frame rate for the encoded frame and selecting a previously stored power offset value associated with the identified transmission rate, responsive to the selection, generating an offset power level based on the reference power level and the selected power offset value, transmitting the encoded frame at a power level derived as a function of the changed offset power level, changing selected power offset value until a coded frame is received at the remote receiver at an error rate which substantially meets a predetermined error rate and storing the current power offset value in the memory in place of the previously stored power offset value for the identified frame rate.

13. A method of operating a transmitter in a cellular communications system, said method comprising the steps of generating a plurality of reference power levels associated with respective frame transmission rates, generating a coded frame of signals, selecting one of the plurality of reference power levels associated with a frame rate at which said coded frame is to be transmitted to a remote receiver, and transmitting the coded frame at a power level derived as a function of the selected reference power level such that the power reference level is adjusted for each of said frames rates according to an external error rate generated for the rate that is being adjusted.

* * * * *